United States Patent [19]

Collins et al.

[11] 3,771,149

[45] Nov. 6, 1973

[54] CHARGE COUPLED OPTICAL SCANNER

[75] Inventors: Dean R. Collins, Dallas, Tex.; David L. Carter, Upper Montclair, N.J.

[73] Assignee: Texas Instruments Incorporated, Dallas, Tex.

[22] Filed: Dec. 30, A1971

[21] Appl. No.: 214,366

[52] U.S. Cl......... 340/173 LT, 307/221 C, 307/304, 317/235 R, 317/235 G, 317/235 N, 340/173 LS

[51] Int. Cl... H01l 11/14, G11c 19/00, G11c 11/42

[58] Field of Search................ 340/173 LT, 173 LS, 340/173 LM, 173 R; 307/304, 221 C; 317/235 B, 234 T, 235 R, 235 G, 235 N

[56] References Cited

UNITED STATES PATENTS

| | | | |
|---|---|---|---|
| 3,651,349 | 3/1972 | Kahng | 307/304 |
| 3,654,499 | 4/1972 | Smith | 307/304 |

OTHER PUBLICATIONS

Altman, The New Concept for Memory and Imaging Charge Coupling, 6/21/71, Electronics, pp. 50–59

McDermott, New Surface–Charge Transistor has high data storage Potential, 12/20/70, Electronic Design 26, p. 28

Altman, New MOS Technique Points Way to Junctionless Devices, 5/11/70, Electronics, pp.112–118

*Primary Examiner*—Bernard Konick
*Assistant Examiner*—Stuart N. Hecker
*Attorney*—James O. Dixon et al.

[57] ABSTRACT

An improved optical scanner includes a semiconductor charge coupled shift register. An overflow reservoir is operably coupled to respective bits of the shift register in accordance with one aspect of the invention to receive electrical charge which is in excess of the storage capability associated with each bit to prevent "blooming." In a different aspect of the invention, an optically inactive semiconductor shift register is coupled with light sensitive regions which are adjacent respective bits of the shift register. A transfer electrode simultaneously shifts electrical data corresponding to the image from the light sensitive regions into the optically inactive shift register bits. The light sensitive elements are then ready to receive new information while the data is being clocked from the shift register. This advantageously reduces the "dead time" of the optically active regions to a minimum.

19 Claims, 4 Drawing Figures

CHARGE COUPLED OPTICAL SCANNER

The present invention pertains to optical scanners in general and more particularly to an improved optical scanner which includes semiconductor charge-coupled shift registers. The optical scanner is structured to minimize dead time and to eliminate blooming.

Charge-coupled devices are metal-insulator-semiconductor devices which belong to a general class of semiconductor charge devices which store and transfer information in the form of electrical charge. The charge-coupled devices are distinguished by the property that the semiconductor portion of the devices is, for the most part, homogeneously doped, regions of different conductivity being required only for injecting or extracting charge. A typical semiconductor charge-coupled device shift register is described for example, in Boyle et al, Bell System Technical Journal 49,587 (1970). In the shift register, a DC bias sufficient to invert the semiconductor surface is applied between electrodes, and the semiconductor material and clocking pulses are applied sequentially to the electrodes. Because of the inversion, semiconductor surface minority carriers are drawn to the semiconductor-insulator interface and tend to collect in the potential wells under the electrode. When the clocking pulses are sufficiently large, the minority carriers migrate from the area under one electrode to the area under the next following a potential well produced by the clocking pulses.

Attractive advantages may be realized by using the charge-coupled device shift register as a solid state camera. For such a use, a silicon substrate is advantageous since the creation of electron hole pairs in silicon by visible to near-infrared light is very efficient. A more detailed description of operation of the charge-coupled device optical scanner is described in Tomsett, et al., Applied Physics Letters 17, Page 111, (1970).

Two major problems are associated with the utilization of charge-coupled device shift registers in optical scanning systems. The first problem is associated with the finite quantity of charge that can be stored in a potential well; and the second problem is characterized as "dead time," that is, the inability to distinguish charge carriers which are generated by light during the shiftout time of the shift register. The problem of "dead time" is considered by Bertram, "Application of the Charge Coupled Device Concept to Solid State Image Sensors," 1971 IEEE INTERNATIONAL CONVENTION, Mar. 22 – 25, New York, N.Y.

Accordingly, an object of the present invention is an improved optical system utilizing semiconductor charge devices integrated on a semiconductor chip.

An additional object is the provision of a semiconductor charge optical system having reduced "dead time."

A further object is a semiconductor charge optical system including means for preventing "blooming" due to localized areas of intense light.

Briefly, in accordance with one aspect of the present invention, an optical scanner comprises a charge coupled shift register defined over one surface of a semiconductor substrate. In a three phase system, each bit of the shift register is defined by at least three spaced apart parallel electrodes. The electrodes are separated from the substrate by a relatively thin insulating layer. Each bit of the shift register defines an optical resolution unit of the scanner. Reservoir means are operably coupled to each bit of the shift register for receiving minority charge carriers which are in excess of the storage capability of the potential well.

More particularly an optical scanning system in accordance with an embodiment of the invention comprises a semiconductor substrate of one conductivity type. A relatively thin insulating layer is formed over one surface of the substrate, and a first plurality of spaced apart, substantially parallel conductive electrodes are defined over the insulating layer thereby forming a charge coupled shift register. A second electrode is formed over the insulating layer laterally spaced from selected ones of the first plurality of electrodes which define the shift register. The second electrode, when appropriately biased, is effective to form a reservoir in the underlying semiconductor surface for receiving charge carriers in excess of the storage capability of the potential well under the adjacent electrode of the charge coupled shift register.

In a different aspect of the invention, an optical scanning system is provided which includes a charge coupled shift register which is optically inactive. This shift register is defined in a first region of a semiconductor substrate surface. A plurality of optically active regions are defined adjacent to the respective bits of the shift register. These optically active regions are effective to store minority carriers in response to impinging light energy. Means are included for transferring this electrical charge resulting from the optical energy to the corresponding bits of the shift register. This information is then shifted out of the shift register in a serial manner by suitable clock pulses. During the shift out time, the optically active regions are available for receiving additional light input information, thereby minimizing the dead time of the optical scanning system.

A feature of the invention is the provision of forming the optical active regions to have the same area as the area of one electrode of the shift register.

Another feature of the invention pertains to forming the area of the optical active region much larger than the area of one electrode of the shift register to maximize sensitivity. This latter configuration may be utilized whenever "blooming" is not a serious problem.

An additional feature of the invention is forming an optical scanning system which both reduces dead time and eliminates blooming. In accordance with this aspect of the invention, a reservoir is provided laterally adjacent the optically active regions. The reservoir is defined by forming a conductive strip over an insulating layer which in turn overlies the semiconductor substrate. By appropriately biasing the electrode, a potential well is formed underneath the electrode which enables electrical charge generated by light impinging upon the optically active areas to flow into the reservoir when the charge exceeds a predetermined level. In a specific aspect of the invention, the reservoir is ohmically connected to a reverse biased p-n junction area in the semiconductor surface to in essence provide an infinite reservoir.

Other objects, advantages and novel features of the invention will be apparent upon reading the following detailed description of illustrative embodiments of the invention in conjunction with the drawings wherein.

Figures 1, 2, 3:
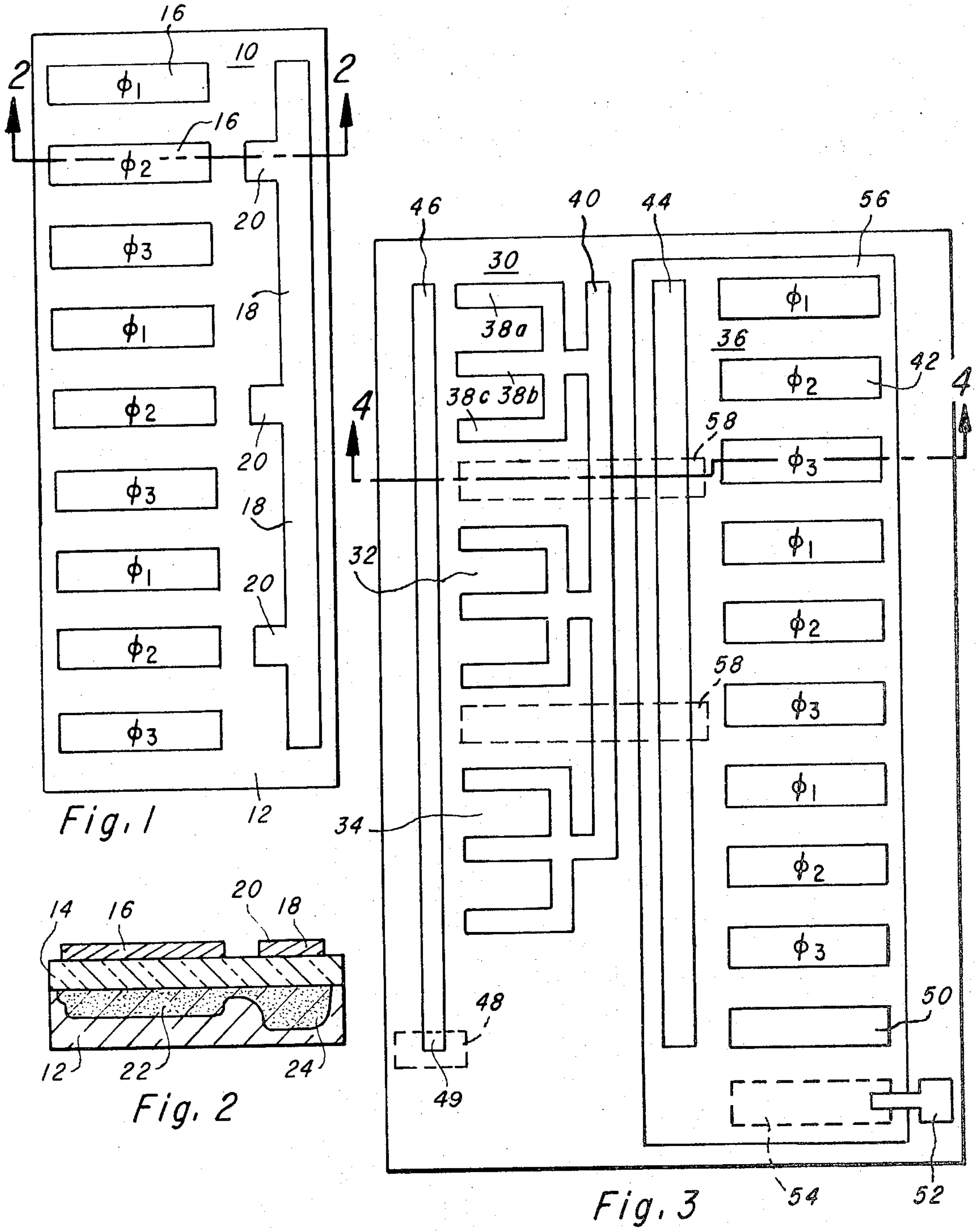
FIG. 1 is a plan view illustrating a semiconductor charge coupled shift register in combination with a reservoir electrode.
FIG. 2 is a cross section of FIG. 1 along line 2—2 and illustrates in graphical form the reservoir potential well.
FIG. 3 illustrates a preferred embodiment of the improved optical scanner system of the present invention.

With reference for the present, particularly to FIGS. 1 and 2, a portion of a charge-coupled optical scanner system is illustrated. The scanner includes a charge-coupled shift register designated generally at 10 defined on a surface of a semiconductor substrate 12. The substrate preferably is p-type silicon having a resistivity of 50 ohm centimeters or greater. It is understood, of course, that n-type silicon could be utilized in addition to other suitable semiconductor materials. A relatively in insulating layer 14 is formed over a surface of the semiconductor substrate 12. The insulating layer 14 may, by way of example, comprise silicon oxide formed to a thickness on the order of approximately 1,000 A. Other insulating layers such as silicon nitride or a combination of silicon nitride and silicon oxide or other suitable insulating materials may be utilized. Electrodes of the charge coupled shift register are illustrated generally at 16. The electrodes may be comprised of any suitable conductive material, such as, by way of example, aluminum. A single level metallization, three-phase system is illustrated in FIG. 1 wherein to obtain shift register action, a multiphase clock is sequentially applied to successive electrodes. Clock sources known to those skilled in the art may be utilized and need not be explained herein. The three-phase clocks are illustrated in FIG. 1 respectively at $\phi_1$, $\phi_2$ and $\phi_3$. Other clocking schemes such as two or four phase clocking could also be used as well as double level metallization systems.

A conductive strip 18 is formed laterally adjacent the shift register 10. The electrode 18 has regions 20 which extend into close proximity to selected electrodes of the shift register. For the example illustrated in FIG. 1, the regions 20 are spaced adjacent to the phase 2 electrodes. Each set of three electrodes of the shift register 10 comprises one bit of information; i.e., one resolution unit of the scanner. Again, for the example illustrated, the phase 2 electrodes are utilized during the light integration interval. That is, during the time in which light is being integrated, phase 2 of the clock is biased to create the deepest potential well. The biasing is such that electrical charge under the two adjacent electrodes ($\phi_1$ and $\phi_3$ electrodes) flows to the potential well underlying $\phi_2$. In accordance with the invention, the conductive electrode 18 is utilized as a reservoir electrode to receive any overflow electrical charge from the $\phi_2$ electrodes of the shift register. This is effective to reduce blooming caused by localized spots of intense light.

In operation, clock pulses are applied to the shift register 10 to free the semiconductor surface 12 from any minority carriers. The scanner is then ready to receive an optical image. Light directed upon the surface of the substrate 12 opposite the electrodes 16 (reference FIG. 2) is effective to create electron-hole pairs in the silicon substrate. If the substrate is n-type material, the total generated minority carriers (holes) diffuse to the inverted region under the electrode 16 where they are transferred under a phase 2 electrode. This is illustrated at 22 in FIG. 2. During this integration time, the electrode potentials are held constant such that the entire surface of the substrate 12 is near inversion and such that a relatively deep well occurs every third electrode for a three-phase system. In the present illustrative example, this deep potential well is formed under the $\phi_2$ electrodes. This electrical potential configuration enables the total number of generated holes to be collected from all three electrodes in each bit position. The reservoir electrode 18 is biased to produce a surface potential near the phase 2 electrodes which is sufficient to drain off excess minority carriers when potential well 22 becomes filled. As soon as the electrical potential in the well 22 reaches a predetermined level determined by the biasing levels, electrical charge flows from the potential well 22 to the laterally spaced potential well 24 under the reservoir electrode 18.

In one aspect of the invention, at least a portion of the reservoir electrode 18 overlays a reverse-biased p-n junction region (not shown) in the semiconductor substrate 12 to provide an essentially infinite sink for the overflow charges which flow from under the electrodes 16 to under reservoir electrode 18.

As understood by those skilled in the art, various parameters such as the amount of separation of the reservoir electrode 18 from the electrodes 16, the various bias voltages, doping levels and surface "resistive seas" may be used to effect the desired transfer of charge to prevent blooming. Further, various configurations such as having the reservoir electrodes on both sides of the shift register 10 or near all electrodes 16 rather than just those electrodes utilized for integration of the signal could be utilized. Furthermore the light may impinge on the substrate 12 through or between electrodes 16 rather than from the back of the substrate.

Figure 4:
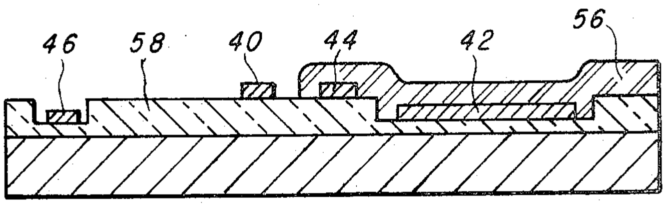
FIG. 4 is a cross section along the line 4—4 of FIG. 3.

With reference to FIGS. 3 and 4, a configuration of an optical scanner effective to reduce dead time, that is, the time in which the imager is shifting out data rather than integrating photons is illustrated. This configuration includes a series of optically active sets of electrodes illustrated at 30, 32, and 34 in parallel with an optically inactive charge coupled shift register illustrated generally at 36. Again a three-phase, single-level metallization shift register is illustrated. It is to be appreciated that multilevel configurations of charge-coupled devices may also advantageously be utilized in accordance with the invention. Such a shift register configuration is described in more detail in co-pending application, Ser. No. 130,358, entitled "Semiconductor Device and Method of Fabrication" by Dean R. Collins, et al. The light sensing elements of the scanner comprise a plurality of fingers **38*a*, 38*b*, and 38*c* commonly connected by a conductive strip 40. The conductive strip 40 is connected to a bias supply (not shown). The light sensing electrodes 30, 32, and 34 collect the minority charge carriers generaged by light which may come from either side of the slice. Preferably each finger structure, i.e., 38*a*, 38*b*, and 38*c*, of the respective light sensing elements is of approximately the same area as one of the electrodes of the charge-coupled shift register, such as electrode 42, in order to prevent charge spillover (i.e., transferring so much charge the capacity of the potential wells under electrodes 42 is exceeded) when the charge is transferred from the light sensing electrodes into a bit of the optically inactive charge-coupled shift register 36. However, when the sensitivity rather than blooming is the primary consideration, then the light sensing electrodes 30, 32, and 34 are preferably much larger than the charge-coupled shift register electrode 42**. A transfer electrode 44 is utilized to create a potential well between light sensing elements 30, 32, and 34 and respecitve bits of the shift register 36, in order to transfer the charge when desired. By way of example, the transfer electrode 44 may comprise a metal strip over a thin insulating layer. The transfer electrode 44 is connected to a suitable clock bias (not shown).

To prevent blooming, a reservoir electrode 46 is formed adjacent the light sensing elements 30, 32, and 34. Operation of the reservoir electrode 46 has been described previously. The reservoir overlies a region 48 of opposite conductivity type in the substrate. This region is reverse biased via an ohmic contact 49.

After the integration time, the charge under the light sensing elements is transferred to the potential wells of respective bits under the charge-coupled shift register electrodes shown at 42. The transfer is effected simultaneously by applying a suitable bias voltage to the transfer electrode 44. At the time of transfer, only one electrode in each bit is biased such as to receive the transferred charge. Subsequent to the transfer, the light sensitive elements 30, 32, and 34, are again effective to store charge during the interval that the shift register 36 shifts out the data. The data is transferred out of the shift register 36 by a transfer electrode 50 and is detected via an ohmic contact 52 to a p-n junction region 54.

The shift register 36 is preferably covered by an opaque material 56. The shift register 36 may be made optically inactive by utilizing an additional masking operation during fabrication. An opaque insulator or an insulator-metal layer may be formed over the electrodes 42 to make the shift register optically inactive.

Certain areas of the bias supply line 40 for the light sensitive elements 30, 32, and 34 and of the transfer electrode 44 are preferably formed over a thick oxide region 58 to prevent inadvertent coupling between adjacent optically active regions 30, 32 and 34. This relatively thick insulating layer may, for example, comprise silicon oxide formed to a thickness on the order of 10,000 A. Alternatively, a region of enchanced conductivity (channel stop) of the same conductvity type as the substrate could be formed by conventional techniques such as diffusion or ion implantation to separate adjacent optically active regions.

By way of illustration, when n-type silicon is utilized for a substrate and the thickness of insulating material and the impurity level is such that the threshold voltage for inverting the substrate surface region to p-type is on the order of − 5 volts, then it may be desirable to bias the substrate with a +5 volts and utilize multiphase clocks having an amplitude varying from 0 to −10 volts. For this situation, the reservoir electrode may advantageously have a value of approximately −1 volt. For these biasing conditions, it may be desirable, during the light integration interval, to bias sections 30, 32, and 34 with a voltage on the order of −10 volts.

While the present invention has been described in detail with reference to specific illustrative embodiments, it will be apparent to those skilled in the art that various modifications may be made without departing from the scope or spirit of the invention.

What is claimed is:

1. In an optical scanning system, the combination comprising:
a. a semiconductor substrate of one conductivity type;
b. a relatively thin insulating layer over one surface of said substrate;
c. a first plurality of spaced apart, substantially parallel conductive electrodes-defined on said insulating layer to define a charge-coupled shift register; and
d. a second reservoir electrode on said insulating layer laterally spaced from selected ones of said first plurality of electrodes, said reservoir electrode defining an essentially infinite sink for excess charge carriers, thereby effectively eliminating blooming affects in said shift register.

2. An optical scanning system as set forth in claim 1 further including:
a. a pocket of opposite conductivity type material extending from said one surface; and
b. means for ohmically connecting the region under said second electrode to said pocket.

3. An optical scanner comprising:
a. a charge-coupled shift register defined over one surface of a semiconductor substrate of one conductivity type, each bit of said shift register defined by a plurality of spaced apart, substantially parallel electrodes separated from said substrate by a relatively thin insulating layer, each bit defining an optical resolution unit of said scanner; and
b. reservoir means disposed adjacent each bit for receiving charge carriers in excess of the storage capability of each bit, said reservoir defining an essentially infinite sink for charge.

4. An optical scanner as set forth in claim 3 wherein said reservoir means comprises a conductive strip over said insulating layer substantially parallel to and laterally spaced from the path of propagation of said shift register, said strip having portions extending into relatively close proximity to the electrode of each set of at least three electrodes under which electrodes electrical charge corresponding to the scanned image is stored, said strip being selectively biased to enhance flow of electrical charge into the region of said substrate underlying said strip whenever the quantity of said stored electrical charge exceeds a predetermined level.

5. An optical scanner as set forth in claim 4 further including:
a. a pocket of opposite conductivity type material extending from said one surface; and
b. means for ohmically connecting said conductive strip to said pocket.

6. An optical scanning system comprising:
a. a charge-coupled shift register defined over a first region of a semiconductor substrate of one conductivity type;
b. an optically opaque layer covering said shift register;
c. a plurality of optically active regions adjacent respective bits of said shift register, said plurality of regions respectively effective to generate electrical charge in said substrate surface responsive to impinging light; said optically active regions respectively defined by parallel electrodes overlying said substrate and separated therefrom by a thin insulating layer, the electrodes of said optically active regions electrically connected in common by a conductive bias strip disposed transversely to said electrodes; and
d. means for simultaneously transferring said electrical charge to corresponding bits of said shift register.

7. An optical scanning system as set forth in claim 6 wherein said optically active regions respectively comprise a set of three electrodes.

8. An optical scanning system as set forth in claim 7 including means for preventing lateral spread of electrical charge between adjacent sets of electrodes.

9. An optical scanning system as set forth in claim 8 wherein said means for preventing lateral spread of electrical charge comprises a relative thick insulating layer between adjacent sets of electrodes.

10. An optical scanning system as set forth in claim 8 wherein said means for preventing lateral spread of electrical charge comprises a region of high conductivity material of said one conductivity type in said semiconductor substrate between adjacent sets of electrodes.

11. In an optical scanning system, the combination comprising:

a. a first charge-coupled shift register defined over one surface of a semiconductor substrate of one conductivity type, each bit of said first charge coupled shift register defined by at least three spaced apart, substantially parallel first conductive electrodes separated from said substrate by a thin insulating layer, each bit defining an optical resolution unit of said scanner;

b. an optically opaque coating formed over said first shift register;

c. a second plurality of substantially parallel conductive electrodes defined on said one surface and separated therefrom by a relatively thin insulating layer, said second plurality of conductive electrodes laterally spaced from said first charge coupled shift register;

d. bias means for applying a predetermined voltage to said second conductive electrodes said bias means electrically connecting said second conductive electrodes in common; and e. transfer means for selectively transferring electrical charge from under said second conductive electrodes to respective bits of said first charge-coupled shift register.

12. An optical scanning system as set forth in claim 11 wherein said transfer means comprises a third conductive electrode over an insulating layer intermediate said first shift register and said second plurality of conductive electrodes.

13. An optical scanning system as set forth in claim 12 wherein said second conductive electrodes defines a plurality of sets of electrodes respectively adjacent succeeding bits of said shift register.

14. An optical scanning system as set forth in claim 13 wherein the area of each set of said second conductive electrodes is substantially the same as the area of a single electrode of said first charge-coupled shift register.

15. An optical scanner system as set forth in claim 13 wherein the area of each set of said second conductive electrodes is much greater than the area of a single electrode of said first charge-coupled shift register.

16. An optical scanning system as set forth in claim 13 including reservoir means laterally spaced from said plurality of sets of second conductive electrodes for receiving charge carriers in excess of the storage capability associated with each set of second conductive electrodes.

17. An optical scanning system as set forth in claim 13 wherein means are included for preventing lateral spread of electrical charge between adjacent sets of said second conductive electrodes.

18. An optical scanning system as set forth in claim 17 wherein said means for preventing lateral spread of charge comprises a relative thick insulating layer over said substrate and separating adjacent sets.

19. An optical scanning system as set forth in claim 17 wherein said means for preventing lateral spread of charge comprises a region of high conductivity type material in said substrate between adjacent sets.

* * * * *